(12) United States Patent
Mizra et al.

(10) Patent No.: US 7,623,043 B2
(45) Date of Patent: Nov. 24, 2009

(54) METHOD AND SYSTEM FOR METERING CONSUMPTION OF ENERGY

(75) Inventors: Nadeem I. Mizra, Farmington, CT (US); Michael Coleman, Ontario (CA); Lawrence A. Sollecito, Amsterdam, NY (US); Jeffrey G. Mazereeuw, Newmarket (CA)

(73) Assignee: General Electric Company, Schenectady, NY (US)

( * ) Notice: Subject to any disclaimer, the term of this patent is extended or adjusted under 35 U.S.C. 154(b) by 194 days.

(21) Appl. No.: 11/305,944

(22) Filed: Dec. 19, 2005

(65) Prior Publication Data

US 2007/0139220 A1    Jun. 21, 2007

(51) Int. Cl.
*G08B 23/00* (2006.01)

(52) U.S. Cl. .................. 340/870.02; 361/624; 361/660; 324/74; 324/114; 307/38; 307/52; 307/11

(58) Field of Classification Search ............ 340/870.02, 340/870.03; 361/624, 660, 659; 307/38, 307/52, 11; 324/74, 114
See application file for complete search history.

(56) References Cited

U.S. PATENT DOCUMENTS

| | | | |
|---|---|---|---|
| 4,050,020 A | | 9/1977 | Germer et al. |
| 4,166,975 A | | 9/1979 | Germer et al. |
| 4,365,302 A | | 12/1982 | Elms |
| 5,861,683 A | * | 1/1999 | Engel et al. .................. 307/38 |
| 5,959,549 A | * | 9/1999 | Synesiou et al. ....... 340/870.02 |
| 6,452,505 B1 | * | 9/2002 | Taglioni ................ 340/870.02 |
| 7,043,380 B2 | * | 5/2006 | Rodenberg et al. ............ 702/62 |
| 7,058,524 B2 | | 6/2006 | Hayes et al. |
| 7,151,329 B2 | * | 12/2006 | Andarawis et al. ............ 307/52 |
| 7,236,897 B2 | | 6/2007 | Gandhi |
| 7,252,543 B2 | | 8/2007 | Caggiano et al. |
| 7,263,450 B2 | * | 8/2007 | Hunter ........................ 702/65 |
| 7,310,052 B2 | * | 12/2007 | Bowman ............... 340/870.02 |
| 7,317,404 B2 | * | 1/2008 | Cumeralto et al. ..... 340/870.02 |
| 7,379,791 B2 | * | 5/2008 | Tamarkin et al. ............ 700/286 |
| 2003/0205938 A1 | * | 11/2003 | Andarawis et al. ............ 307/11 |
| 2004/0174664 A1 | * | 9/2004 | Werner et al. ................ 361/624 |
| 2004/0189488 A1 | | 9/2004 | Elliott et al. |
| 2006/0052906 A1 | * | 3/2006 | Kates ........................ 700/295 |
| 2006/0271314 A1 | | 11/2006 | Hayes |
| 2007/0279041 A1 | | 12/2007 | Fritz et al. |

* cited by examiner

*Primary Examiner*—Albert K Wong
(74) *Attorney, Agent, or Firm*—GE Global Patent Operation; Roger C. Phillips

(57) ABSTRACT

A module for an electrical distribution system is provided. The module includes a socket board electrically coupled to the electrical distribution system. A plurality of sockets is mounted on the socket board. Each socket defines a port. A sensor is positioned within each port and is electrically coupled to the socket board. The sensors are configured to carry at least one of a primary current and a secondary current. A metering component is electrically coupled to the socket board and configured to measure current carried by the sensors. A communication module is electrically coupled to the metering component and in communication with a monitoring device. The communication module is configured to transmit metering data to the monitoring device.

18 Claims, 3 Drawing Sheets

METHOD AND SYSTEM FOR METERING CONSUMPTION OF ENERGY

BACKGROUND OF THE INVENTION

This invention relates generally to the consumption of energy and, more particularly, to a method and system for metering the consumption of energy.

Submetering of electrical use is required in commercial, residential, industrial and utility applications. Conventional submetering systems require the location of a metering device, such as an intelligent electrical device (IED), external to an electrical distribution panel. Installation and/or wiring of the external metering device in the field is expensive, requires additional space adjacent the electrical distribution panel and/or increases opportunity for defect as defined in the six sigma quality process. Further, a customer cannot easily access the energy information of the metering device from a remote location. Conventional metering devices further require the installation of specialized communication wiring, such as RS 485 cables and/or Cat 5 cables.

BRIEF DESCRIPTION OF THE INVENTION

In one aspect, the present invention provides a module for an electrical distribution system. The module includes a socket board electrically coupled to the electrical distribution system. A plurality of sockets is mounted on the socket board. Each socket defines a port. Each sensor of a plurality of sensors is positioned within a corresponding port and electrically coupled to the socket board. The sensors are configured to carry at least one of a primary current and a secondary current. A metering component is electrically coupled to the socket board and configured to measure current carried by the sensors. A communication module is electrically coupled to the metering component and in communication with a monitoring device. The communication module is configured to transmit metering data to the monitoring device.

In another aspect, a metering system is provided. The metering system includes a module electrically coupled to an electrical distribution system. The module includes a socket board defining a plurality of sockets. Each socket defines a port. Each sensor of a plurality of sensors is inserted within a corresponding port and configured to sense a current flowing through the sensor. A metering component is electrically coupled to each socket and configured to meter the current flow through each sensor. A communication module is in communication with the metering component and configured to transmit metering data to a monitoring device.

In another aspect, a method for metering consumption of energy is provided. The method includes independently sensing a consumption of energy by each load of a plurality of loads. The consumption of energy for each load is metered. Metering data for each load is communicated to a monitoring device. The metering data is logged for each load.

DETAILED DESCRIPTION OF THE INVENTION

The present invention provides a method and system for managing the usage and/or consumption of energy by multiple users and/or multiple loads. By metering and logging the energy consumption for each user and/or load, energy consumption can be better managed. The method and system of the present invention is suitable for commercial, residential, industrial and utility applications.

Figure 1:
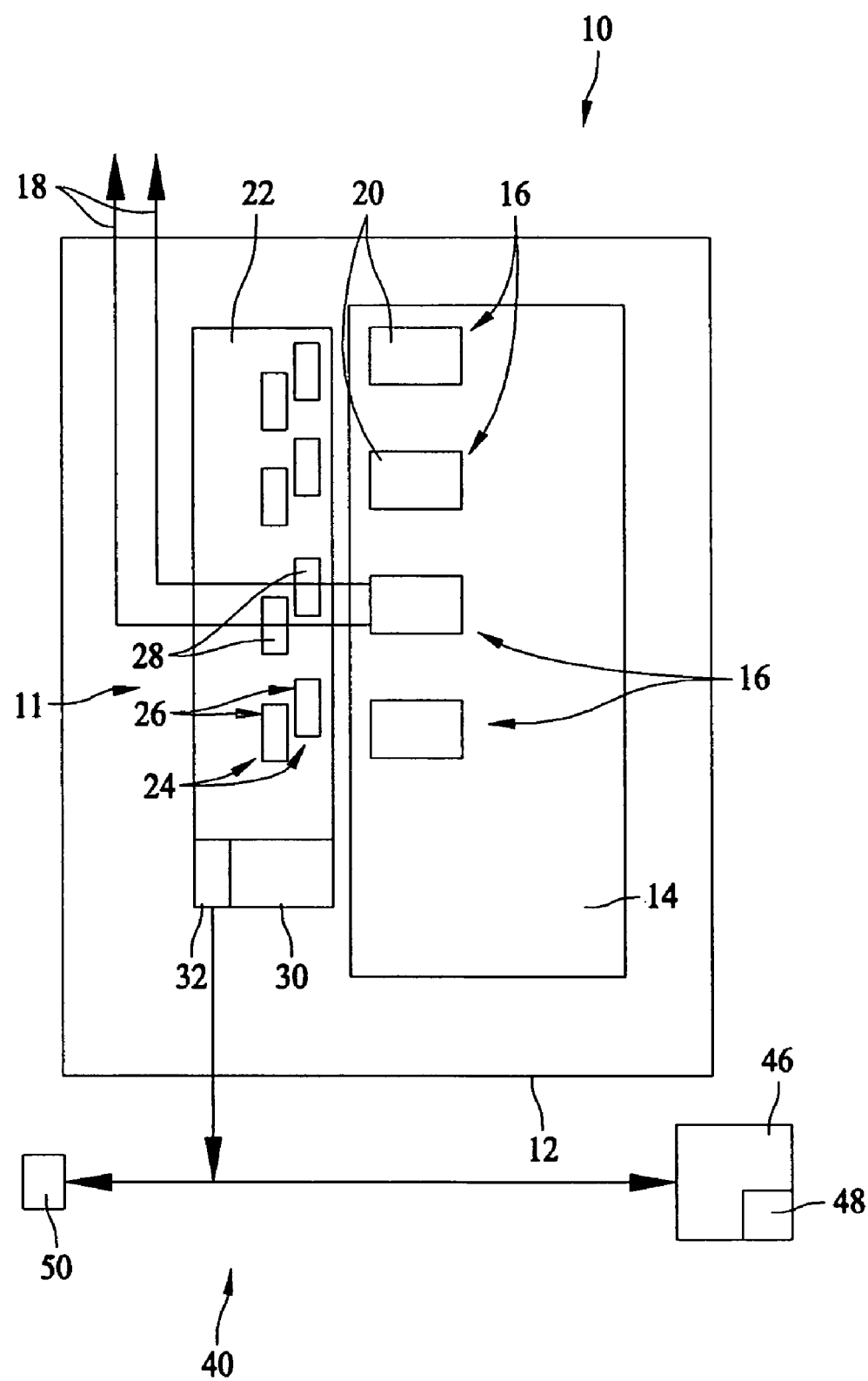
FIG. 1 shows an exemplary system for metering the consumption of energy.
Figure 2:
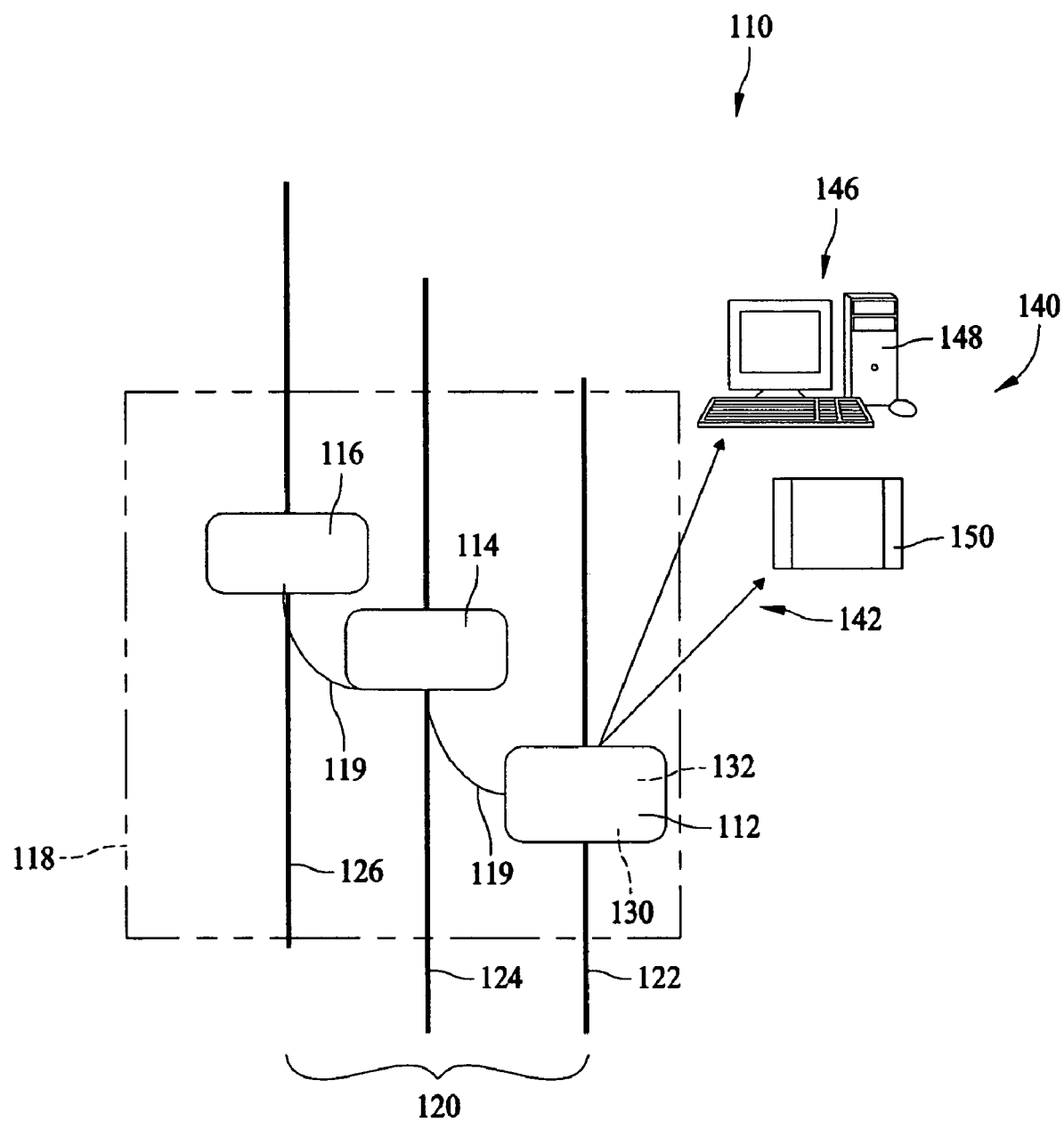
FIG. 2 shows an alternative exemplary system for metering the consumption of energy.
Figure 3:
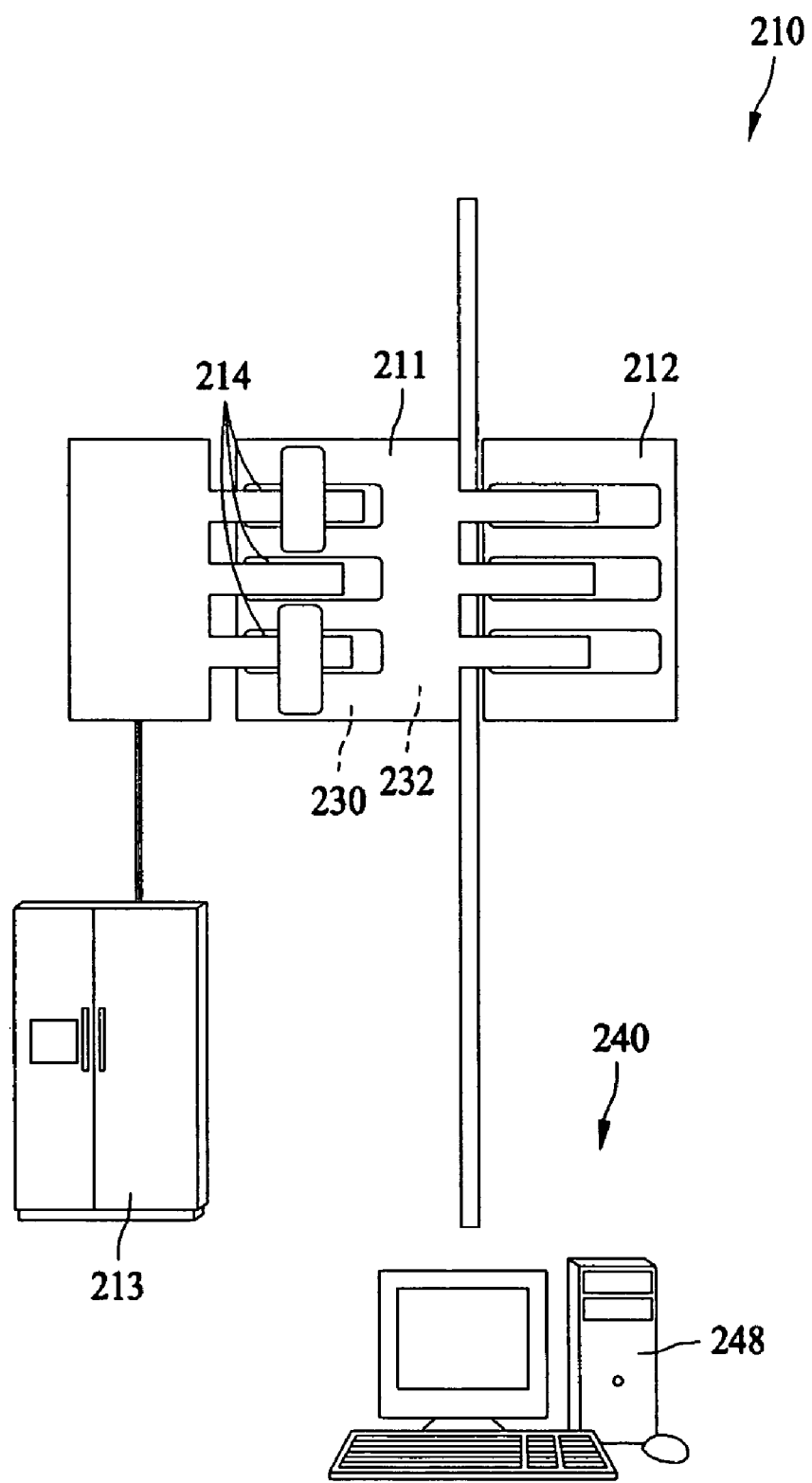
FIG. 3 shows an alternative exemplary system for metering the consumption of energy.

Referring to FIGS. 1-3, a metering system 10 for metering consumption of energy by multiple users and/or multiple loads is provided. Metering system 10 is electrically coupled to an electrical distribution system 12 that is configured to distribute electricity supplied by a power distribution grid. In one embodiment, electrical distribution system 12 includes an electrical distribution panel, a circuit breaker panel, a switchboard or a household electrical receptacle.

FIG. 1 shows an exemplary module 11 for metering system 10. As shown in FIG. 1, module 11 is housed within an electrical distribution panel 14. Module 11 is suitable for new electrical distribution systems 12 and/or retrofitting existing electrical distribution systems 12, without modifications. Electrical distribution panel 14 includes a plurality of circuits 16. Each circuit 16 delivers a suitable current through wiring 18 to operate a single load and/or multiple loads, such as an apartment building, an apartment, a condominium, a lighting fixture, a computer, a television and/or a household appliance. A suitable circuit breaker 20 is coupled to each circuit 16 to facilitate opening of corresponding circuit 16 if an unsafe current level is reached.

In one embodiment, module 11 includes a socket board 22 electrically coupled to electrical distribution system 12. In this embodiment, socket board 22 includes a suitable printed circuit board for mounting at least one electronic component, as desired. A plurality of sockets 24 are defined within or mounted on socket board 22. Each socket 24 defines a port 26 within which a corresponding sensor 28 is positioned. In one embodiment, each sensor 28 is a current transformer (CT) or a Micro-Electro-Mechanical System (MEMS), configured to sense a current carried by and/or flowing through a corresponding circuit 16 and/or sensor 28. In alternative embodiments, sensor 28 may include any suitable sensing component capable of sensing a current flow known to those skilled in the art and guided by the teachings herein provided. Sensor 28 is electrically coupled to socket board 22 and configured to carry a first or primary current and/or a second or secondary current. In one embodiment, each sensor 28 is configured to step down the primary current to a lower secondary current. In a particular embodiment, at least one sensor 28 includes a current transformer having similar or different physical dimensions and/or similar or different electrical characteristics to remaining sensors 28. In an alternative embodiment, sensors 28 are configured to carry a plurality of currents having different amperage.

As shown in FIG. 1, a central metering component 30 is electrically coupled to socket board 22 and configured to meter or measure current carried by sensors 28. In one embodiment, metering component 30 is configured to independently measure current carried by each sensor 28. In a particular embodiment, metering component 30 includes suitable electronic components mounted to socket board 22 and powered using a control power from the voltage that is being measured. Metering component 30 is electrically coupled to and/or in communication with a communication module 32 and configured to transmit the metering data corresponding to the measured current flowing through each sensor 28.

As shown in FIG. 1, communication module 32 is mounted to socket board 22. Communication module 32 is in communication with a monitoring device 40 and is configured to transmit the metering data metered by metering component 30 to monitoring device 40. In one embodiment, communication module 32 includes a power line carrier (PLC) system for transmitting the metering data to monitoring device 40 using power lines. Alternatively, communication module 32 is configured to transmit the metering data to monitoring device 40 using a wireless data transmission system. It is apparent to those skilled in the art and guided by the teachings herein provided that communication module 32 may include any suitable data transmission system or device for transmitting the metering data to a local location and/or a remote location.

In one embodiment, monitoring device 40 includes a remote monitoring device 46 in communication with communication module 32. Remote monitoring device 46 is configured to display remotely the metering data. For example, remote monitoring device 46 includes a computer 48 in communication with communication module 32. Computer 48 includes software configured to save, log and/or analyze the metering data. Further, computer 48 is configured to organize the metering data to individually meter and log consumption of energy by each user of multiple users and/or each load of multiple loads. Computer 48 is configured to access the metering data and log the metering data to generate a summary of the metering data for energy consumption by each user and/or each load. Using the summary of the metering data, a cost for energy consumption for each user and/or each load can be calculated and the usage and/or consumption of energy by multiple users and/or multiple loads can be better managed.

Alternatively, or in addition to remote monitoring device 46, monitoring device 40 includes a local monitoring device 50 in communication with communication module 32 and configured to display locally the metering data. In one embodiment, local monitoring device 50 includes a suitable display panel that displays the metering data for multiple users and/or multiple loads. Further, local monitoring device 50 includes a touch screen display (not shown) to selectively monitor energy consumption, as desired.

FIG. 2 shows an exemplary metering system 110 for metering consumption of energy by multiple users and/or multiple loads according to one embodiment. Metering system 110 includes a plurality of sensors and is configured to meter a poly-phase voltage circuit, such as a poly-phase low/medium voltage circuit 120. Metering system 110 is further configured to transmit the metering data to a monitoring device 140. As shown in FIG. 2, metering system 110 includes a first or master sensor 112, such as a master current transformer, and a plurality of secondary sensors, such as second sensor 114 and third sensor 116, as shown in FIG. 2. In this embodiment, second sensor 114 and third sensor 116 each includes a secondary current transformer electrically coupled to master sensor 112. Master sensor 112 and sensors 114, 116 are positioned within a switchgear 118, shown in phantom lines. In one embodiment, each sensor 114, 116 is electrically coupled to master sensor 112 using a wire 119 or other suitable electrical connector. In alternative embodiments, master sensor 112, second sensor 114 and/or third sensor 116 include a MEMS or any suitable sensing mechanism known to those skilled in the art and guided by the teachings herein provided.

Referring to FIG. 2, in one embodiment master sensor 112 is positioned with respect to a first phase line 122 of poly-phase voltage circuit 120 and is configured to independently meter a current flow through first phase line 122. Similarly, second sensor 114 is positioned with respect to a second phase line 124 of poly-phase voltage circuit 120 and third sensor 116 is positioned with respect to a third phase line 126 of poly-phase voltage circuit 120 to independently meter a current flow through second phase line 124 and/or third phase line 126, respectively. Master sensor 112 includes at least one suitable integrated electronic component, such as an integrated metering component 130 configured to meter the current flow through first phase line 122 and/or an integrated communication module 132 configured to transmit the metering data to monitoring device 140. In a particular embodiment, metering component 130 is the same or identical to metering device 30 and communication module 132 is similar or identical to communication device 32, as described above in reference to metering system 10. Further, in this embodiment, master sensor 112 is also configured to receive and process the metering data sensed by second sensor 114 and/or third sensor 116, and transmit the corresponding metering data to monitoring device 140.

In one embodiment, the metering data is transmitted to monitoring device 140 using a suitable wireless data transmission, such as a radio-frequency (RF) data transmission system 142. In alternative embodiments, the metering data is transmitted to monitoring device 140 using a suitable data transmission system, including a wired system and/or a wireless system, known to those skilled in the art and guided by the teachings herein provided. Monitoring device 140 may include any suitable monitoring equipment, such as a remote monitoring device 146 similar or identical to remote monitoring device 46, and/or a local monitoring device 150 similar or identical to local monitoring device 50, as described above in reference to metering system 10.

In one embodiment, monitoring device 140 includes remote monitoring device 146 in communication with master sensor 112 and/or communication module 132. Remote monitoring device 146 is configured to display remotely the metering data. For example, remote monitoring device 146 includes a computer 148 in communication with master sensor 112. Computer 148 includes software configured to save, log and/or analyze the metering data. Further, computer 148 is configured to organize the metering data to individually meter and log consumption of energy by each user of multiple users and/or each load of multiple loads. Computer 148 is configured to access the metering data and log the metering data to generate a summary of the metering data for energy consumption by each user and/or each load. Using the summary of the metering data, a cost for energy consumption for each user and/or each load can be calculated and the usage and/or consumption of energy by multiple users and/or multiple loads can be better managed.

Alternatively, or in addition to remote monitoring device 146, monitoring device 140 includes local monitoring device 150 in communication with master sensor 112 and/or a communication module electrically coupled to master sensor 112. Local monitoring device 150 is configured to display locally the metering data. In one embodiment, local monitoring device 150 includes a suitable display panel that displays the metering data for multiple users and/or loads. Further, local monitoring device 150 includes a touch screen display (not shown) to monitor energy consumption as desired.

FIG. 3 shows an exemplary metering system 210 for metering consumption of energy by multiple users and/or multiple loads according to one embodiment. Although metering system 210 is described below in reference to managing energy consumption within a residential setting including, without limitation a single family residence or a multiple family residence, such as an apartment building, it is apparent to those skilled in the art and guided by the teachings herein provided that metering system 210 may be used in other suitable settings, including commercial, residential, industrial or utility applications.

As shown in FIG. 3, metering system 210 includes a module or receptacle 211 that is configured to be electrically coupled to an existing electrical circuit, such as by inserting receptacle 211 into a wall power outlet 212. A load 213, such as a light fixture, a computer, a television and/or a household appliance, such as a refrigerator (as shown in FIG. 3), stove, or dishwasher, is electrically coupled to receptacle 211. In one embodiment, receptacle 211 accepts a standard plug for load 213. Receptacle 211 includes a plurality of sensors 214, a metering component 230 and a communication module 232. In a particular embodiment, metering component 230 and/or communication module 232 are similar or identical to metering component 30 and communication module 32, respectively, as described above in reference to metering system 10. In one embodiment, each sensor 214 includes a current transformer that is electrically coupled to metering component 230. In alternative embodiments, sensors 214 include a MEMS or other suitable sensing mechanism known to those skilled in the art and guided by the teachings herein provided.

Metering component 230 is configured to meter the current flow through each sensor 214. Metering component 230 generates and transmits metering data corresponding to the current flow sensed by each sensor 214 to communication module 232. In this embodiment, communication module 232 is a PLC system. In alternative embodiments, communication module 232 is any suitable communication system for transmitting the metering data to a monitoring device 240.

In one embodiment, communication module 232 transmits the metering data to monitoring device 240 including a computer 248 in communication with receptacle 211 and/or communication module 232. Computer 248 includes software configured to save, log and/or analyze the metering data. Further, computer 248 is configured to organize the metering data to individually meter and log consumption of energy by each user of multiple users and/or each load of multiple loads. Computer 248 is configured to access the metering data and log the metering data to generate a summary of the metering data for energy consumption by each user and/or each load. Using the summary of the metering data, an actual cost for energy consumption for each user and/or each load can be calculated and the usage and/or consumption of energy by multiple users and/or multiple loads can be better managed.

Thus, the present invention provides a system configured to independently sense energy usage and/or consumption by multiple users and/or multiple loads; meter the energy consumption for each user and/or each load; communicate a set of metering data for each user and/or each load to a monitoring device; and log the set of metering data for each user and/or load. Further, the system is configured to generate a summary of the metering data and/or a corresponding bill for each user and/or each load. The system facilitates the awareness of actual energy usage and associated cost and promotes energy conservation.

In one embodiment, a method for metering consumption of energy is provided. The method includes independently sensing a consumption of energy by each load of multiple loads. The energy consumption for each load is metered and the metering data for each load is communicated to a monitoring device. In one embodiment, the metering data is transmitted over power lines to the external device, such as a computer. The monitor device logs the metering data for each load. The monitoring device is configured to analyze the logged metering data to calculate a cost for energy consumption for each load, for example. Additionally, or alternatively, the monitoring device is configured to meter and log a consumption of energy by each user of multiple users.

The above-described method and system for metering consumption of energy facilitate management of energy usage and consumption by an individual user or load. More specifically, the method and system facilitate independent metering of energy consumption by multiple loads and logging energy consumption for each load to better manage and conserve energy. As a result, energy consumption can be reliably and efficiently metered, logged and managed.

Exemplary embodiments of a method and system for metering consumption of energy are described above in detail. The method and system is not limited to the specific embodiments described herein, but rather, steps of the method and/or components of the system may be utilized independently and separately from other steps and/or components described herein. Further, the described method steps and/or system components can also be defined in, or used in combination with, other methods and/or systems, and are not limited to practice with only the method and system as described herein.

While the invention has been described in terms of various specific embodiments, those skilled in the art will recognize that the invention can be practiced with modification within the spirit and scope of the claims.

What is claimed is:

1. A module for an electrical distribution system, said module comprising:
   a socket board electrically coupled to said electrical distribution system;
   a plurality of sockets mounted on said socket board, each socket of said plurality of sockets defining a port;
   a plurality of sensors each positioned within and configured by a corresponding port, each said sensor electrically coupled to said socket board and configured to carry at least one of a primary current and a secondary current;
   a metering component electrically coupled to said socket board and configured to independently measure current carried by said plurality of sensors as configured by said corresponding port; and
   a communication module electrically coupled to said metering component and in communication with a monitoring device, said communication module configured to transmit metering data to said monitoring device.

2. A module in accordance with claim 1 wherein said monitoring device comprises at least one of a remote monitoring device in communication with said communication module and configured to display remotely the metering data, and a local monitoring device in communication with said communication module and configured to display locally the metering data.

3. A module in accordance with claim 2 wherein said remote monitoring device comprises a computer having software configured to log the metering data.

4. A module in accordance with claim 1 wherein said electrical distribution system comprises one of an electrical distribution panel, a circuit breaker panel, a switchboard and a household electrical receptacle.

5. A module in accordance with claim 1 wherein said module is housed within said electrical distribution system.

6. A module in accordance with claim 1 wherein each said sensor comprises one of a current transformer and a Micro-Electro-Mechanical System.

7. A metering system comprising:
- a module electrically coupled to an electrical distribution system, said module comprising:
  - a socket board defining a plurality of sockets, each socket of said plurality of sockets defining a port; and
  - a plurality of sensors each inserted within and configured by a corresponding port and configured to sense a current flowing through said sensor;
- a metering component electrically coupled to each said socket and configured to meter the current flow through each said sensor as configured by said corresponding port; and
- a communication module in communication with said metering component and configured to transmit metering date to a monitoring device.

8. A metering system in accordance with claim 7 wherein said monitoring device further comprises a remote monitoring device in communication with said communication module and configured to display remotely the metering data.

9. A metering system in accordance with claim 7 wherein said monitoring device further comprises a local monitoring device in communication with said communication module and configured to display locally the metering data.

10. A metering system in accordance with claim 7 wherein each sensor is configured to sense a current flow through one phase of a plurality of phases and said metering component is configured to independently meter the current flow through each phase of said plurality of phases.

11. A metering system in accordance with claim 7 wherein said sensors are configured to carry a plurality of currents each having a different amperage.

12. A metering system in accordance with claim 7 wherein said communication module is configured to transmit the metering data to said monitoring device using a wireless data transmission system.

13. A metering system in accordance with claim 7 wherein said monitoring device comprises a computer configured to remotely access the metering data and log the metering data.

14. A metering system in accordance with claim 7 wherein said metering system is configured to:
- sense a consumption of energy by a plurality of users;
- meter the consumption of energy for each user of said plurality of users;
- communicate a set of metering data for each said user to said monitoring device; and
- log the set of metering data for each said user.

15. A metering system in accordance with claim 14 further configured to generate a summary of the metering data for each said user.

16. A method for metering consumption of energy, said method comprising:
- independently sensing a consumption of energy by each load of a plurality of loads using a socket board defining a plurality of sockets, each socket of the plurality of sockets defining a port, wherein a sensor is inserted within, and configured by, a corresponding port;
- metering the consumption of energy for each load;
- communicating metering data for each load to a monitoring; and
- logging the metering data for each load.

17. A method in accordance with claim 16 further comprising calculating a cost for energy consumption for each load.

18. A method in accordance with claim 16 further comprising metering and logging consumption of energy by each user of a plurality of users.

* * * * *

UNITED STATES PATENT AND TRADEMARK OFFICE
CERTIFICATE OF CORRECTION

PATENT NO. : 7,623,043 B2  Page 1 of 1
APPLICATION NO. : 11/305944
DATED : November 24, 2009
INVENTOR(S) : Mirza et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 203 days.

Signed and Sealed this

Twenty-sixth Day of October, 2010

David J. Kappos
*Director of the United States Patent and Trademark Office*